Sept. 6, 1966  V. S. JENSEN ETAL  3,271,095

PROJECTOR FOR CONTINUOUS SOUND AND MOTION PICTURE FILM

Filed June 15, 1964  4 Sheets-Sheet 1

Louis M. Goldstone,
Volmer Sofas Jensen,
INVENTORS.

WHANN & McMANIGAL
Attorneys for Applicants by

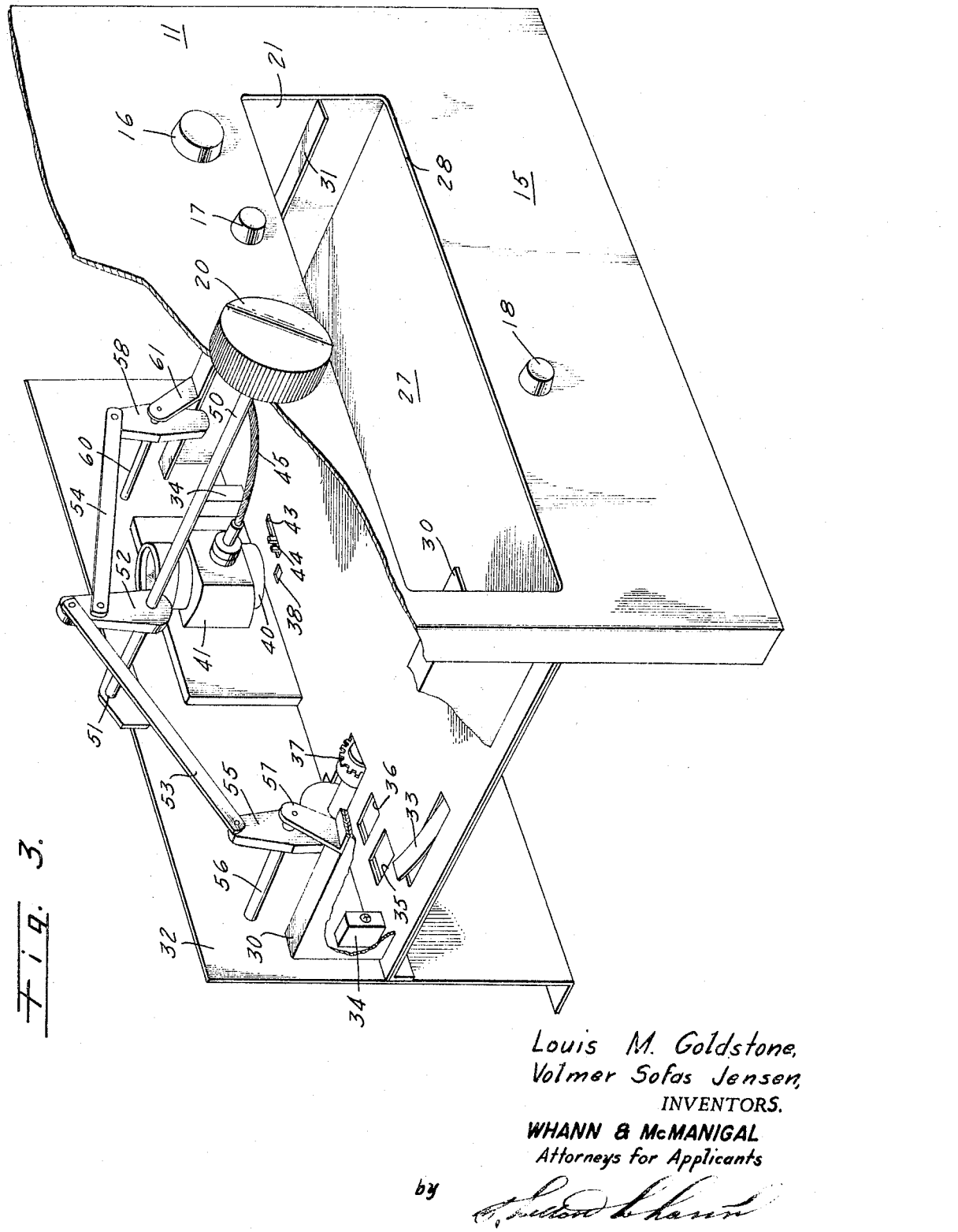

Sept. 6, 1966 V. S. JENSEN ETAL 3,271,095
PROJECTOR FOR CONTINUOUS SOUND AND MOTION PICTURE FILM
Filed June 15, 1964 4 Sheets-Sheet 3
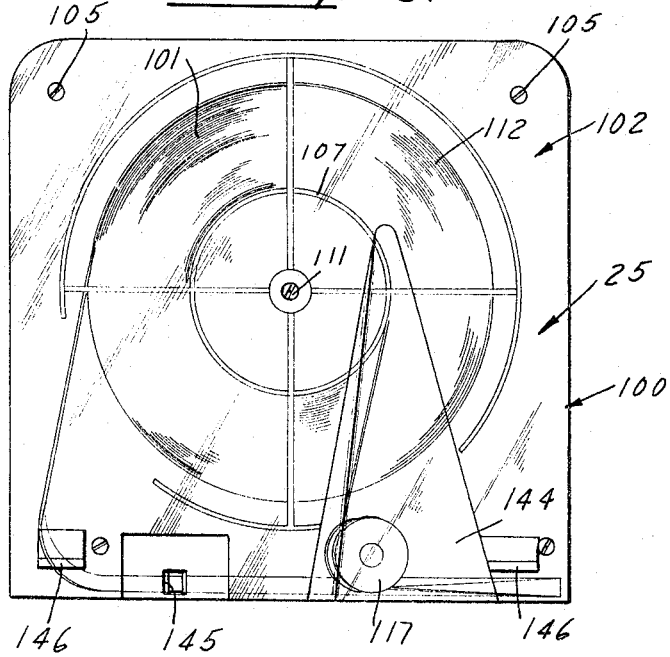
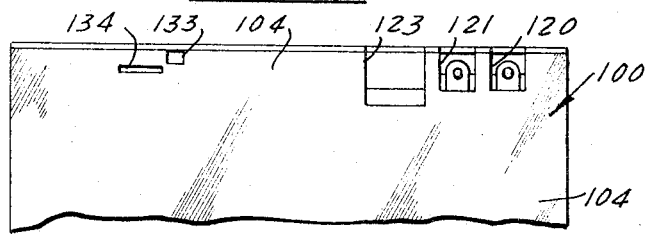
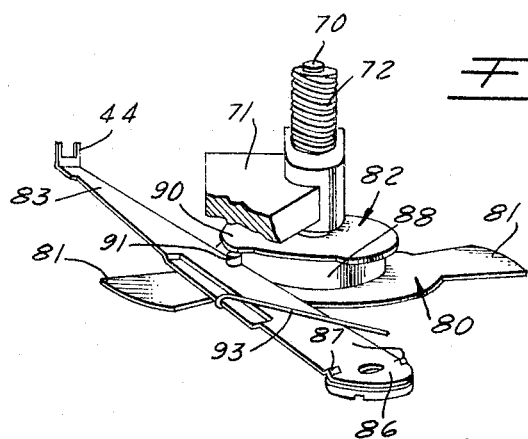
Louis M. Goldstone,
Volmer Sofas Jensen,
INVENTORS.
WHANN & McMANIGAL
Attorneys for Applicants
by

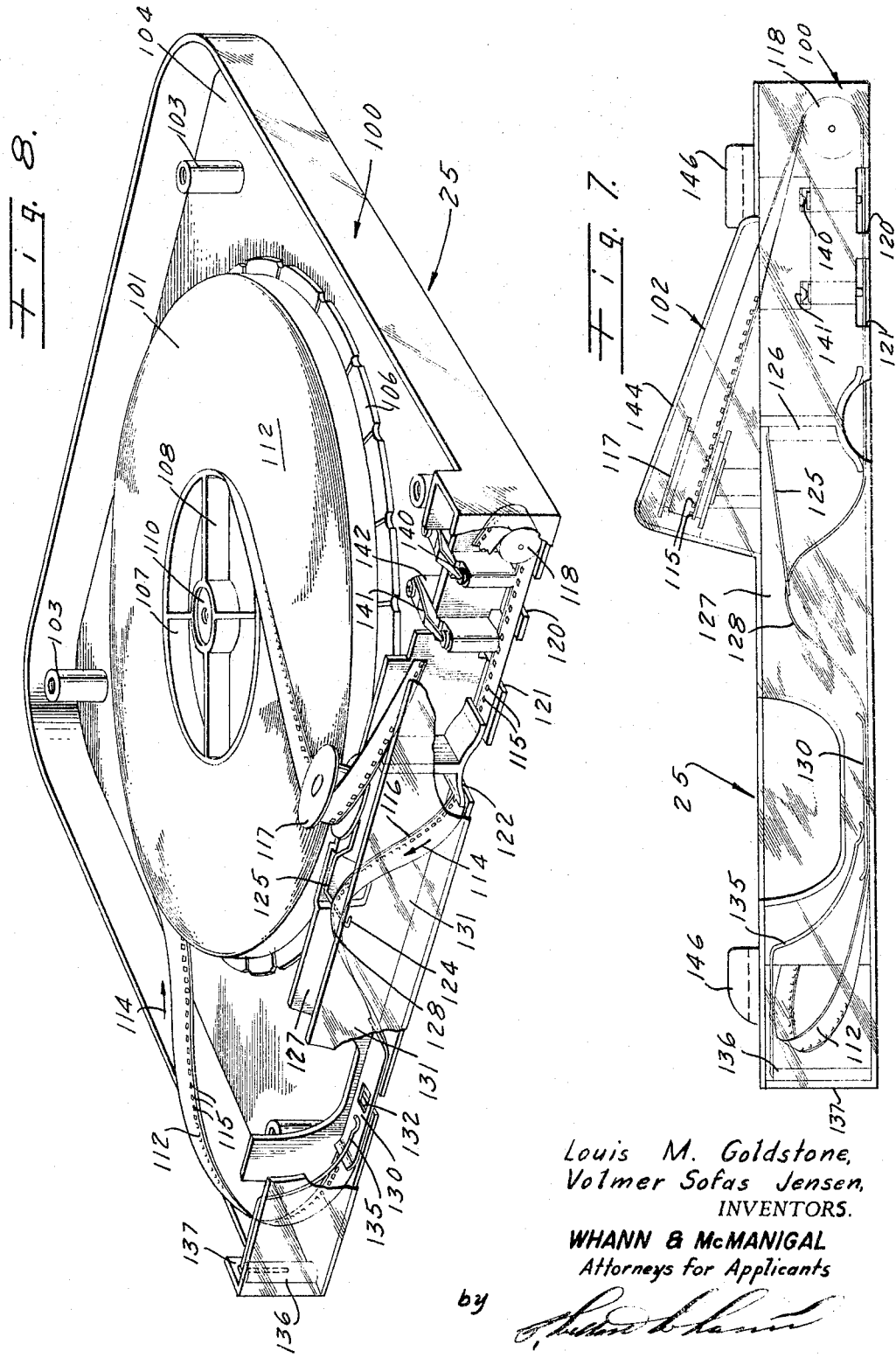

United States Patent Office 3,271,095
Patented Sept. 6, 1966

3,271,095
PROJECTOR FOR CONTINUOUS SOUND AND
MOTION PICTURE FILM
Volmer S. Jensen, Glendale, and Louis M. Goldstone, Beverly Hills, Calif., assignors, by mesne assignments, to Jayark Instruments Corporation, a corporation of New York
Filed June 15, 1964, Ser. No. 374,998
10 Claims. (Cl. 352—34)

This invention relates generally to film projectors, and particularly relates to a self-contained, portable machine for projecting motion picture film and for reproducing sound recorded on the film, preferably, by a magnetic tape.

There is a great demand for a small, lightweight machine to project motion picture film and to reproduce, simultaneously, sound recorded on the film. Such a device is extremely useful to salesmen for demonstrating the wares they are selling. In addition, a motion picture and sound projector of this type, is also of great value in the medical field.

Here, the projector is used for reproducing professionally produced medical films for patient counselling. Thus, the film may indicate the nature of an operation to relieve a given ailment or demonstrate to the patient contemplated therapy or surgery.

However, unless such a film projector is portable, relatively inexpensive and reproduces sound, in addition to projecting the motion picture film, it cannot be used for the purposes indicated above. In addition, a projector of this type should be able to work with a film which is self-winding and disposed in an endless loop. In addition, it should eliminate the problem of handling the film, threading it through the projector and rewinding it after each use of the machine.

It is accordingly an object of the present invention to provide a film projector which is portable and relatively inexpensive for projecting motion picture film and for simultaneously reproducing sound recorded on the film.

Another object of the present invention is to provide a film projector of the type referred to which is adapted to cooperate with a self-contained, rewinding film cartridge so that the film need not be threaded through the projector.

A further object of the present invention is to provide a film projector of the character referred, so constructed that the films can be rapidly changed by the average person and without the necessity of rewinding the film or threading the film through the projector.

In accordance with the present invention, there is provided a projector for projecting motion picture film and for reproducing sound recorded on the film. The film is of the type having sprocket holes and preferably has sound recorded thereon by a magnetic tape. The film is disposed in a self-winding film cartridge. The projector, in accordance with the invention, has a housing provided with an aperture for receiving the cartridge. The housing has a bottom wall which is aligned with the lowe edge of the aperture. A pair of spaced guide rails are disposed parallel to the bottom wall so as to confine the film cartridge when it is introduced into the aperture.

A continuously rotatable sprocket wheel extends through the bottom wall. Further, spring means are disposed in the bottom wall for normally urging the cartridge when it is introduced into the projector upwards against the guide rails to clear the sprocket wheel. Finally, there are manually operable means for selectively pushing the cartridge downwardly against the bottom wall to engage the sprocket wheel with the sprocket holes in the film. This is all that is needed to assure cooperation between the self-contained film cartridge and the film projector. The film is now ready to be played. After the film has been played, the entire cartridge can be readily removed and replaced by another cartridge containing a different film.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIG. 3 is an elevational front view in perspective, parts being broken away, to illustrate particularly the film cartridge receiving area of the projector and the intermittent and continuous film advancing members;

FIG. 4 is an elevational view in perspective similar to that of FIG. 2, parts being broken away, and illustrating particularly the claw fingers actuating mechanism including a cam;

FIG. 5 is a top plan view of the film cartridge cooperating with the film projector of FIGS. 1 through 4;

FIG. 6 is a bottom plan view of the cartridge of FIG. 5, parts being broken away, and illustrating particularly that part of the cartridge cooperating with the continuous and discontinuous film advancing members as shown in FIG. 3;

FIG. 7 is a front elevational view of the film cartridge of FIG. 5; and

FIG. 8 is an elevational view in perspective on enlarged scale of the film cartridge of FIG. 5 with the top cover removed to illustrate particularly the path of the film past two sound heads, the continuously moving sprocket wheel and the light aperture.

Figure 1:
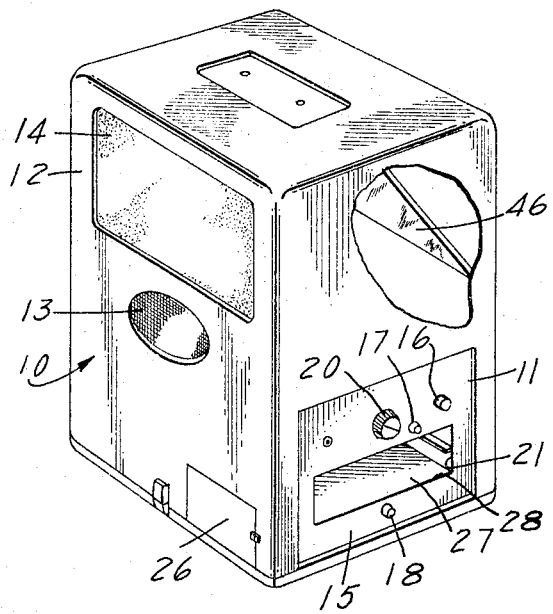
FIG. 1 is a view in perspective showing a film projector in accordance with the present invention.

Referring now to the drawings and particularly to FIGS. 1 through 4, there is illustrated a film projector embodying the present invention. As shown particularly in FIG. 1, the film projector is enclosed by a housing generally indicated at 10 having a front wall 11 and a side wall 12. The side wall 12 is provided with a speaker grille 13 behind which a loud speaker is located and with a screen 14 for viewing thereon the projected motion pictures. The front wall 11 is provided with a control panel 15 having a volume control knob 16, a picture focus control knob 17, a picture frame adjusting knob 18 and a cartridge lock knob 20. An aperture 21 is disposed in the control panel 15 and permits to introduce the self-contained film cartridge generally shown at 25 in FIG. 5.

The panel 26 on the side wall 12 of the housing 10 serves the purpose to store the electric cord of the projector.

The interior space of the film projector which is adapted to receive the film cartridge 25 is shown particularly in FIG. 3. This interior space is defined by a bottom wall 27 which is aligned with the lower edge 28 of the cartridge aperture 21. A pair of guide rails 30 and 31 are disposed in the interior space of the projector parallel to the bottom wall 27. They serve the purpose to confine the cartridge 25 when it is introduced into the film aperture 21. The guide rails 30 and 31 are suitably secured to the projector, for example, to the rear bulkhead 32.

A pair of cartridge leaf springs 33 of which only one is shown, extend upwardly from the bottom wall 27. They serve the purpose to push the film cartridge upwardly against the guide rails 30 and 31.

A pair of stops 34 are secured to the vertical bulkhead 32 and serve the purpose to limit the inward movement of the film cartridge.

The bottom wall 27 is provided with two adjacent apertures 35 and 36 along the path of the film and through which may extend a cut-off pickup head and a sound pickup head, not further illustrated. Adjacent the aperture 36 for the sound pickup head is a continuously rotatable sprocket wheel 37 which also extends through the bottom wall 27. An aperture 38 is further spaced along the bottom wall 27; that is along the path of the film and serves the purpose to permit the light from a light source, not shown, to project through the film and into a lens system 40 which is adjustably mounted in housing 41. Adjacent the light aperture 38 is an elongated aperture 43 through which extend two claw fingers 44 which serve the purpose to move the film intermittently past the light aperture 38.

The picture focus control knob 17 is connected to a flexible cable 45 which serves the purpose to move the projector lens system 40 upwards or downwards in its housing 41 by mechanism well known and not illustrated. This, in turn, permits to control the focus for the projected pictures. The pictures are projected from the lens system 40 onto a mirror 46 (see FIG. 1) from where the pictures are projected onto the screen 14 to be viewed directly by the observer.

Before explaining the mechanism which moves the film continuously by means of the sprocket wheel 37 and discontinuously through the claw fingers 44, the cartridge lock mechanism will now be explained.

The cartridge lock knob 20 is fixed to a control shaft 50 journaled at 51 and extending through the control panel 15 of the housing. A cam lever 52 is fixed to the control shaft 50 and has journaled thereto two levers 53 and 54. Lever 53, in turn, is journaled to a cam lever 55 which, in turn, is rotatable about a shaft 56 fixed to the rear bulkhead 32 and to a fixed arm 57 extending from the guide rail 30. The arm 54 is similarly pivoted to a cam lever 58 which, in turn, is rotatable on a shaft 60 pivoted to the rear bulkhead 32 and to an arm 61 secured to the guide rail 31.

Accordingly, when the control knob 20 is rotated in a clockwise direction, both of the arms 53 and 54 will move from left to right thus rotating the two cam levers 55 and 58 also in a clockwise direction. On the other hand, when the control knob 20 is rotated in a counterclockwise direction, the two cam arms 55 and 58 will also rotate in a counterclockwise direction. Thus, it will readily be seen that the lower free ends of the two cam levers 55 and 58 can be rotated into the position shown in FIG. 3, to lower the film cartridge 25 after it has been introduced into the projector.

Figure 2:
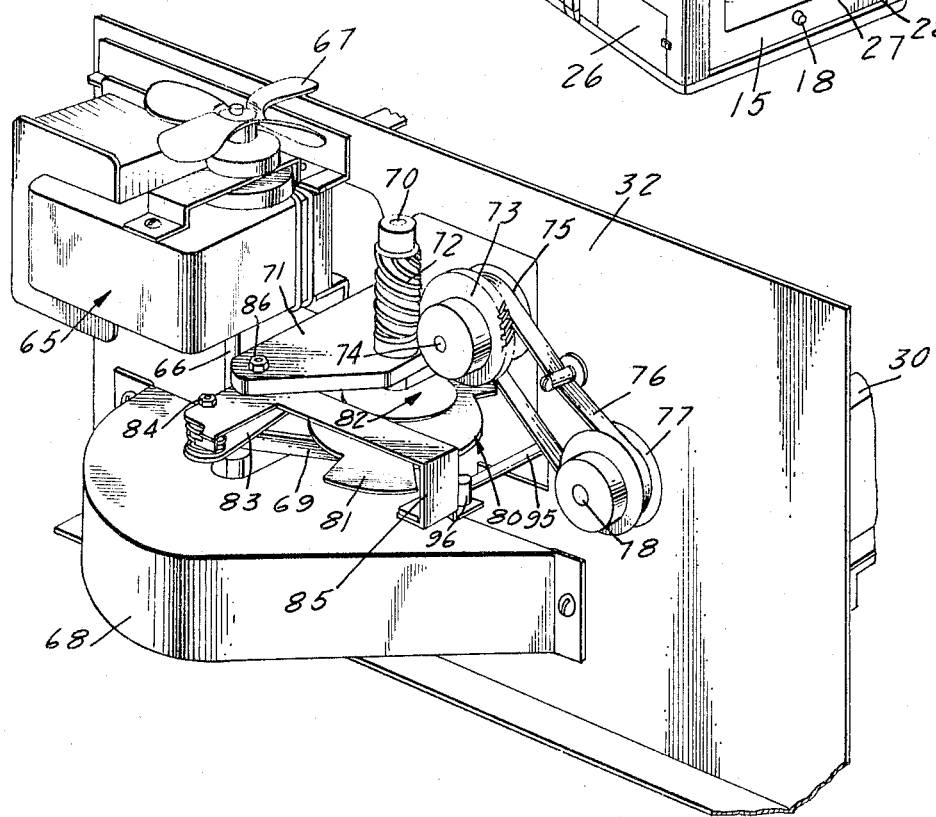
FIG. 2 is an elevational rear view in perspective of the film projector of FIG. 1, illustrating particularly the electric motor, the fan and the major portion of the film advancing mechanism.

The film advancing mechanism will now be explained, particularly with reference to FIGS. 2 and 4. The film projector has a single electric motor generally indicated at 65 which may be secured to the vertical bulkhead 32. The electric motor 65 has a vertical motor shaft 66 extending above and below the motor. Secured to the upper end of the shaft 66 is a fan 67 which is used to circulate the air in the projector to cool the lamp, not shown, the lower end of the shaft 66 bears a blower, not illustrated, disposed in the blower housing 68. This will supplement the air circulation caused by the fan 67.

There is also disposed a vertical drive shaft 70 journaled in the horizontal bracket 71, which may be secured to the bulkhead 32. The vertical drive shaft 70 is driven from the motor shaft 66 through a transmission belt shown at 69 which is guided by a pair of pulleys, not shown, on the motor shaft 66 and the drive shaft 70.

A worm 72 is secured to the drive shaft 70 and meshes with the gear 73 on a horizontal shaft 74 which may also be journaled in the bulkhead 32. A pulley 75 is also secured to the horizontal shaft 74 and drives, by means of a timing belt 76 and a pulley 77, another shaft 78. The sprocket wheel 37 is secured to the shaft 78 and is driven thereby to rotate at a continuous rate.

The manner in which the claw fingers 44 extending through the slot 43 are actuated will now be explained. Secured to the drive shaft 70 is a disc 80 having a pair of outwardly extending ears 81. The ears 81 are of sufficient length to obscure the light path from the light source through the light aperture 38 and the lens system 41. Accordingly, each picture on the film can be obscured while it is being moved and also while it is held stationary to increase the picture reproduction rate from 24 to 48 as is conventional practice.

A cam structure 82 is also keyed to the drive shaft 70 and rotates with the lens shutter ears 81 and the worm 72. The cam structure 82 cooperates with a claw 83 carrying at its outer end the claw fingers 44. The claw 83 is pivoted at 84 to a generally L-shaped frame 85 which, in turn, has its pivot at 86 in the horizontal bracket 71. The claw 83 has a round end portion 86 surrounding the pivot 84 which is provided at its upper surface with a pair of projections 87 which are adapted to rest and slide on the lower surface of the frame 85. This will permit the claw 83 to pivot up and down about the projections 87. The cam portion 88 on the cam structure 82 is provided with a lobe to move the claw 83 and hence the sprocket fingers 44 to the left and right as viewed in FIG. 4 thereby to advance the film. The cam portion 90 on the cam structure 82 cooperates with a disc-like projection 91 on the claw 83 to cause the claw to move up and down with respect to the aperture 43. Accordingly, the claw fingers 44 engage and disengage the sprocket holes in the film.

A spring 93 is hooked over an edge of the claw 83 and its other end is fixed to the framework in a manner not shown to urge the claw 83 against the cam structure 82.

By means of the picture frame adjusting knob 18 the position of the claw fingers 44 with respect to the aperture 43 on the film may be adjusted. Thus, the control knob 18 is secured to a shaft 95 having a threaded end portion engageable with the threaded cylinder 96 secured to the frame 85. Hence, rotation of the picture frame adjusting knob 18 will rotate the frame 85 about its pivot 86. This, in turn, will rotate the claw pivot point 84 with respect to the fixed pivot 86 and hence adjust the position of the sprocket fingers 44 with respect to the aperture 43.

Before describing the operation of the film projector, reference is now made to FIGS. 5 through 8, which illustrate the film cartridge which will now be described. The film cartridge of FIGS. 5 through 8 is claimed in the copending patent application entitled "Self-Winding Film Cartridge," filed concurrently herewith in the names of the inventors of the present application. The film cartridge generally indicated at 25 in FIG. 5 consists of a main or film receiving portion 100 which supports the film reel 101 and a cover generally indicated at 102. The film receiving cartridge 100 is generally of rectangular shape with two rounded corners as shown particularly in FIG. 8. Four uprights 103 are molded or otherwise secured to the bottom wall 104 of the film receiving cartridge 100 and are provided with internal threads as shown so that the cover 102 may be secured to the film receiving cartridge 100 by screws indicated at 105.

The film reel 101 forms a continuous loop and rests on a rotatable plate 106 secured to a cylinder 107 having four arms 108 rotatably secured to the cartridge bottom wall 104. A center portion 110 is provided with an internal screw thread so that the cover may be secured thereto by a screw 111.

The film 112 moves in the direction shown by arrows 114, that is, the film is taken off from the interior of the film reel 101 and is put back on the exterior of the film reel as is conventional. The film 112 is provided with sprocket holes 115 and a magnetic tape track 116 disposed between the outer edge of the film 112 and the sprocket holes 115.

The film is first lifted out of the plane of the film reel 101 and moved over an idler 117, the axis of which is inclined as shown and which is rotatably mounted on the film receiving cartridge 100. The film then moves over a second idler 118 having a horizontal axis and which is also rotatably mounted on the film cartridge 100. As a result, the film 112 now moves in a horizontal plane after having been originally in a vertical plane. This, of course, will facilitate the projection of light through the film without interference of the film cartridge.

From the idler 118 the film moves past a sound cutoff aperture 120 which exposes the film to a first magnetic pickup head, not shown, which responds to a special signal to cut off the electric motor 65. The film then moves past a second aperture 121 to expose the film to a second sound pickup head, not shown, which cooperates with the magnetic tape track 116 to reproduce the sound. Subsequently, the film moves below a curved plate 122 disposed over an aperture 123 to insure engagement between the sprocket holes 115 of the film and the sprocket wheel 37.

Thereafter, the film moves over an L-shaped spring portion 124, being the free end of the spring generally indicated at 125 having its other end secured to a molded pocket 126 in a vertical intermediate wall 127 of the film cartridge 100. The spring 126 preferably consists of a wire of suitable spring material. The purpose of the spring portion 124 is to create a film loop 128 between the sprocket plate 122 and a pressure plate 130, the film loop having an adjustable length. The film loop 128 is confined between the front wall 131 of the film cartridge 100 and the intermediate wall 127.

The pressure plate 130 is provided with an aperture 132 to permit a light beam from the light source to be projected through the pictures on the film 112. The bottom wall 104 of the film cartridge 100 is provided with a matching aperture 133. The aperture 134 in the bottom wall 104 of the film cartridge permits the sprocket fingers 44 to extend therethrough to move the film intermittently past the aligned apertures 132, 133.

The pressure plate 130 has upwardly curved end portions so that the film easily feeds into and out of the pressure plate. The pressure plate 130 is held downwardly by another spring wire 135 having its other end secured to a molded pocket 136 on a side wall 137 of the film cartridge.

A pair of identical cylinders 140 aligned with the sound apertures 120, 121 are each urged downwardly by a cooperating leaf spring 141 secured in turn to an upright 142. Accordingly, the cylinders 140 are pressed downwardly to insure proper engagement of the magnetic tape track 116 on the film 112 with the two sound pickup heads.

The cover 102 is provided with an upwardly projecting inclined portion 144 to accommodate the inclined idler 117 and the film portion which is taken out of the plane of the film reel 101. An aperture 145 in the cover 102 matches the light aperture 133 in the bottom wall 104 and the aperture 132 in the pressure plate 130 to permit the light from the light source to project through the film picture without interference. A pair of upwardly extending cam stops 146 are disposed on both sides of the cover 102 to lock the film cartridge 25 against the cam levers 55 and 58 when in their lower position.

The operation of the film projector of the invention and of the film cartridge will now be described. The film is threaded onto the film receiving cartridge 100 as shown in FIG. 8. This is preferably done by the manufacturer so that the user will never have to thread the film himself. Thereupon, the cover 102 is put on the film cartridge and the film is ready for use.

A film cartridge containing the desired film is pushed by the customer with the exposed film side first into the aperture 27 in the film projector. As the film cartridge is pushed into the projector, it is pushed upwardly by the leaf springs 33 against the guide rails 30 and 31. The cartridge is pushed back until its front wall 131 contacts the stops 34 in the projector housing. Thereupon, the cartridge lock button 20 is rotated until the cam levers 55 and 58 push the cartridge downwardly and the film 112 with its sprocket holes 115 into engagement with the sprocket wheel 37. The film is now ready to be played. It should be noted that the film cartridge 25 is now locked into place because stops 34 engage cartridge front wall 131 and stops 146 engage the cam levers 55, 58. Hence, the cartridge cannot move up or down nor can it move back and forth.

After the electric motor 65 is energized, the film is moved at a constant rate by the steadily rotating sprocket wheel 37 past the two sound apertures 35 and 36. As explained hereinbefore, there is a magnetic pickup head in register with the aperture 35 which responds to a special magnetic marker disposed on the film which, in turn, cuts off the electric motor 65 to stop the film and the lamp. Another magnetic pickup head is in register with the aperture 36 and reproduces the sound on the magnetic sound track 116 of the film 112 through a conventional audio amplifier which may be a transistor amplifier. Consequently, the amplified sound may be reproduced by the speaker disposed behind grille 13.

The film is pulled discontinuously by the claw fingers 44 past the light apertures 38, 133, 132 and 145. The light projected through the film pictures is focused by the lens system 40, reflected by the mirror 46 and projected onto a frosted plate or screen 14.

Preferably, the film 112 is an 8 mm. motion picture film which moves at the rate of 18 feet per minute. The film is taken at the rate of 24 frames per second, each frame being projected twice to give an apparent projection rate of 48 frames per second. The film cartridge is sufficiently large to contain a film that plays for 20 minutes corresponding to 360 feet of film.

As pointed out before, the focus of the pictures may be adjusted by the focus control knob 17 which moves the lens 40 up and down. The sound volume can be controlled by the volume control knob 16. In case the picture is not properly framed, the picture frame adjusting knob 18 may be moved thereby to rotate the claw 83 about the fixed pivot point 84 which will adjust the relative position of the sprocket fingers 44 with respect to the aperture 43 or the film. Rotation of the cam structure 82 simultaneously causes the sprocket fingers to move from one end to the other of the aperture 43 and to move into and out of the aperture thereby to advance the film intermittently by intermittent engagement of the fingers 44 with the film sprocket holes 115.

There has thus been disclosed an improved film projector adapted to cooperate with a film cartridge holding a self-contained, self-winding film loop. The film projector is characterized by an improved mechanism for advancing the film continuously past a sound pickup head and discontinuously past a light source for projecting the pictures. The film projector is so arranged that the film cartridge can be simply inserted through an aperture in the projector where upon the film is positioned to cooperate with both the continuous and the discontinuous film-advancing mechanism. The film projector is self-contained and of such small weight that it can be readily carried.

The invention and its attendant advantages will be understood from the foregoing description. It will be apparent that various changes may be made in the form, construction and arrangement of the parts of the invention without departing from the spirit and scope thereof or sacrificing its material advantages, the arrangement hereinbefore described being merely by of example. We do not wish to be restricted to the specific form shown or uses mentioned except as defined in the accompanying claims, wherein various portions have been separated for clarity of reading and not for emphasis.

We claim:

1. A projector for projecting motion picture film and for reproducing sound recorded on the film, the film having sprocket holes and being disposed in a self-winding film cartridge,
   (a) said projector having a housing provided with an aperture for receiving the cartridge;
   (b) a bottom wall in said housing;
   (c) a pair of spaced guide rails disposed parallel to said bottom wall to confine the cartridge when introduced into said aperture;
   (d) a continuously rotatable sprocket wheel extending through said bottom wall;
   (e) spring means on said bottom wall for normally urging the cartridge when introduced into said aperture upwards against said guide rails to clear said sprocket wheel; and
   (f) manually operable means for pushing the cartridge downwardly against said bottom wall to engage said sprocket wheel with the sprocket holes in the film.

2. A projector for projecting motion picture film and for reproducing sound recorded on the film, the film having sprocket holes and being disposed in a self-winding film cartridge,
   (a) said projector having a housing provided with an aperture for receiving the cartridge;
   (b) a bottom wall in said housing;
   (c) a pair of spaced guide rails disposed parallel to said bottom wall to confine the cartridge when introduced into said aperture;
   (d) a continuously rotatable sprocket wheel extending through said bottom wall;
   (e) leaf springs on said bottom wall for normally urging the cartridge when introduced into said aperture upwards against said guide rails to clear said sprocket wheel; and
   (f) manually operable cam levers for pushing the cartridge downwardly against said bottom wall to engage said sprocket wheel with the sprocket holes in the film.

3. A projector for projecting motion picture film and for reproducing sound recorded on the film, the film having sprocket holes,
   (a) a self-winding film cartridge for receiving the film disposed in a closed loop;
   (b) said projector having a housing provided with an aperture for receiving said cartridge;
   (c) a bottom wall in said housing;
   (d) a pair of spaced guide rails disposed parallel to said bottom wall to confine said cartridge when introduced into said aperture;
   (e) a first stop on said bottom wall to limit the inward movement of said cartridge;
   (f) a continuously rotatable sprocket wheel extending through said bottom wall;
   (g) spring means on said bottom wall for normally urging said cartridge when introduced into said aperture upwards against said guide rails to clear said sprocket wheel;
   (h) manually operable cam means for pushing said cartridge downwardly against said bottom wall to engage said sprocket wheel with the sprocket holes in the film; and
   (i) a second stop on said cartridge cooperating with said cam means for preventing movement of said cartridge into or out of said housing when said cam means is in the downward position.

4. A projector for projecting motion picture film and for reproducing sound recorded on the film, the film having sprocket holes and being disposed in a self-winding film cartridge,
   (a) said projector having a housing defining an aperture for introducing the cartridge;
   (b) a bottom wall in said housing and aligned with the lower edge of said aperture;
   (c) a sprocket wheel extending through said bottom wall;
   (d) an electric motor;
   (e) means coupled to said electric motor for continuously rotating said sprocket wheel;
   (f) two claw fingers extending through said bottom wall and spaced from said sprocket wheel along the path of the film and adapted to engage the sprocket holes of the film; and
   (g) means coupled to said electric motor for cyclically moving said fingers in a direction to advance the film intermittently by engagement with the sprocket holes thereof and thereafter to move the fingers out of the path of the film.

5. A projector for projecting motion picture film and for reproducing sound recorded on the film, the film having sprocket holes and being disposed in a self-winding film cartridge,
   (a) said projector having a housing defining an aperture for introducing the cartridge;
   (b) a bottom wall in said housing and aligned with the lower edge of said aperture;
   (c) a sprocket wheel extending through said bottom wall;
   (d) an electric motor;
   (e) means coupled to said electric motor for continuously rotating said sprocket wheel;
   (f) two claw fingers extending through said bottom wall and spaced from said sprocket wheel along the path of the film and adapted to intermittently engage the sprocket holes of the film; and
   (g) unitary cam means coupled to said electric motor and in engagement with said fingers for cyclically moving said fingers into a direction to advance the film intermittently by engagement with the sprocket holes thereof and thereafter to move the fingers out of the path of the film.

6. A projector for projecting motion picture film and for reproducing sound recorded on the film, the film having sprocket holes and being disposed in a self-winding film cartridge,
   (a) said projector having a housing defining an aperture for introducing the cartridge;
   (b) a bottom wall in said housing and aligned with the lower edge of said aperture;
   (c) a sprocket wheel extending through said bottom wall;
   (d) an electric motor;
   (e) means coupled to said electric motor for continuously rotating said sprocket wheel;
   (f) two claw fingers extending through said bottom wall and spaced from said sprocket wheel along the path of the film and adapted to intermittently engage the sprocket holes of the film;
   (g) first cam means coupled to said electric motor and in engagement with said fingers cyclically moving said fingers in a direction to advance the film intermittently by engagement with the sprocket holes thereof; and
   (h) second cam means coupled to said motor and in engagement with said fingers for cyclically moving the fingers out of the path of the film.

7. A projector for projecting motion picture film and for reproducing sound recorded on the film, the film having sprocket holes and being disposed in a self-winding film cartridge,
   (a) said projector having a housing;
   (b) a bottom wall in said housing;
   (c) a sprocket wheel extending through said bottom wall;
   (d) an electric motor;
   (e) a fan disposed in said projector coupled to said motor for circulating air through said housing;

(f) means coupled to said motor for continuously rotating said sprocket wheel;
(g) two claw fingers extending through said bottom wall and spaced from said sprocket wheel along the path of the film and adapted to engage the sprocket holes of the film; and
(h) means coupled to said electric motor and in engagement with said fingers for cyclically moving said fingers in a direction to advance the film intermittently by engagement with the sprocket holes thereof and thereafter to move the fingers out of the path of the film.

8. A projector for projecting motion picture film and for reproducing sound recorded on the film, the film having sprocket holes and being disposed in a self-winding film cartridge,
   (a) said projector having a housing;
   (b) a bottom wall in said housing;
   (c) a sprocket wheel extending through said bottom wall;
   (d) a light aperture in said bottom wall and disposed in the path of the film for projecting light therethrough;
   (e) an electric motor;
   (f) means coupled to said electric motor for continuously rotating said sprocket wheel;
   (g) two claw fingers extending through said bottom wall in the vicinity of said light aperture and spaced from said sprocket wheel along the path of the film and adapted to engage the sprocket holes of the film;
   (h) unitary cam means coupled to said electric motor and to said fingers for cyclically moving said fingers in a direction to advance the film intermittently by engagement with the sprocket holes thereof and thereafter to move the fingers out of the path of the film; and
   (i) a lens shutter coupled to said electric motor and to said cam means and having extended portions for obscuring intermittently said light aperture.

9. A projector for projecting motion picture film and for reproducing sound recorded on the film, the film having sprocket holes and being disposed in a self-winding film cartridge,
   (a) said projector having a housing;
   (b) a bottom wall in said housing;
   (c) a sprocket wheel extending through said bottom wall;
   (d) an electric motor;
   (e) means coupled to said electric motor for continuously rotating said sprocket wheel;
   (f) a claw having at one end two fingers extending through said bottom wall and spaced from said sprocket wheel along the path of the film and adapted to engage the sprocket holes of the film;
   (g) a bracket having pivoted thereto said claw, said bracket having a fixed pivot point;
   (h) unitary cam means coupled to said electric motor and in engagement with said claw for cyclically moving said claw and said fingers about said bracket in a direction to advance the film intermittently by engagement with the sprocket holes thereof and thereafter to move the fingers out of the path of the film; and
   (i) adjustable means coupled to said bracket for rotating said bracket about its fixed pivot point, thereby to adjust the relative position of said fingers with respect to the film.

10. A projector for projecting motion picture film and for reproducing sound recorded on the film, the film having sprocket holes and being disposed in a self-winding film cartridge,
    (a) said projector having a housing;
    (b) a bottom wall in said housing;
    (c) a sprocket wheel extending through said bottom wall;
    (d) an electric motor;
    (e) means coupled to said electric motor for continuously rotating said sprocket wheel;
    (f) a claw having at one end two fingers extending through said bottom wall and spaced from said sprocket wheel along the path of the film and adapted to engage the sprocket holes of the film, said claw having at its other end a pivot hole and a pair of projections;
    (g) a bracket having a pivot extending through said pivot hole in said claw, said bracket having a fixed pivot point;
    (h) unitary cam means coupled to said electric motor and in engagement with said claw for cyclically moving said claw and said fingers about said bracket in a direction to advance the film intermittently by engagement with the sprocket holes thereof and thereafter to rock said claw about its projection, thereby to move the fingers out of the path of the film; and
    (i) adjustable means coupled to said bracket for rotating said bracket about its fixed pivot point, thereby to adjust the relative position of said fingers with respect to the film.

References Cited by the Examiner
UNITED STATES PATENTS

| | | | |
|---|---|---|---|
| 3,048,081 | 8/1962 | Biedermann et al. | 352—34 |
| 3,176,310 | 3/1965 | Finnerty | 352—29 |

FOREIGN PATENTS

| | | |
|---|---|---|
| 1,306,575 | 9/1962 | France. |

JULIA E. COINER, *Primary Examiner.*